United States Patent [19]

Sorensen

[11] Patent Number: 4,464,327

[45] Date of Patent: *Aug. 7, 1984

[54] INJECTION MOLDING OF THERMOPLASTICS IN SANDWICH MOLD EMPLOYING DESYNCHRONIZED INJECTION PERIODS

[76] Inventor: Jens O. Sorensen, P.O. Box 2274, Rancho Santa Fe, Calif. 92067

[*] Notice: The portion of the term of this patent subsequent to Aug. 23, 2000 has been disclaimed.

[21] Appl. No.: 471,772

[22] Filed: Mar. 3, 1983

Related U.S. Application Data

[63] Continuation-in-part of Ser. No. 275,408, Jun. 19, 1981, Pat. No. 4,400,341.

[51] Int. Cl.³ .............................................. B29F 1/00
[52] U.S. Cl. .............................. 264/328.8; 264/328.9; 264/331.11; 264/334
[58] Field of Search .............. 264/39, 297, 334, 328.8, 264/328.9, 331.11; 425/183, 190

[56] References Cited

U.S. PATENT DOCUMENTS

| | | | |
|---|---|---|---|
| 2,698,460 | 1/1955 | Amo | 264/328.9 |
| 2,992,455 | 7/1961 | Salzmon | 425/562 |
| 3,647,338 | 3/1972 | Ise | 425/247 |
| 3,659,997 | 5/1972 | Rees | 425/247 |
| 3,663,145 | 5/1972 | Teraoka | 425/250 |
| 3,669,601 | 6/1972 | Lainesse | 425/249 |
| 3,723,040 | 3/1973 | Rees | 425/245 |
| 3,973,892 | 8/1976 | Rees | 425/250 |
| 4,400,341 | 8/1983 | Sorensen | 264/328.8 |

Primary Examiner—John Parrish
Attorney, Agent, or Firm—Brown & Martin

[57] ABSTRACT

A method of cyclic injection molding a thermoplastic material, utilizing a combination of a sandwich mold and an injection unit which together encompass a bifurcated feed system with a molten core. The feed system includes a channel system encompassed by the injection unit and a runner system encompassed by the sandwich mold. The feed system defines a first branch for feeding a first cooling cavity encompassed by a first parting surface, and a second branch for feeding a second cooling cavity encompassed by a second parting surface. Each cooling cavity passes through a retracted period and a protracted period which together make up its production cycle. The retracted period includes an injection period and a cooling period. The protracted period includes an opening period and a closing period. The method is characterized by the step of desynchronizing the injection period of the first cooling cavity with the injection period of the second cooling cavity.

11 Claims, 13 Drawing Figures

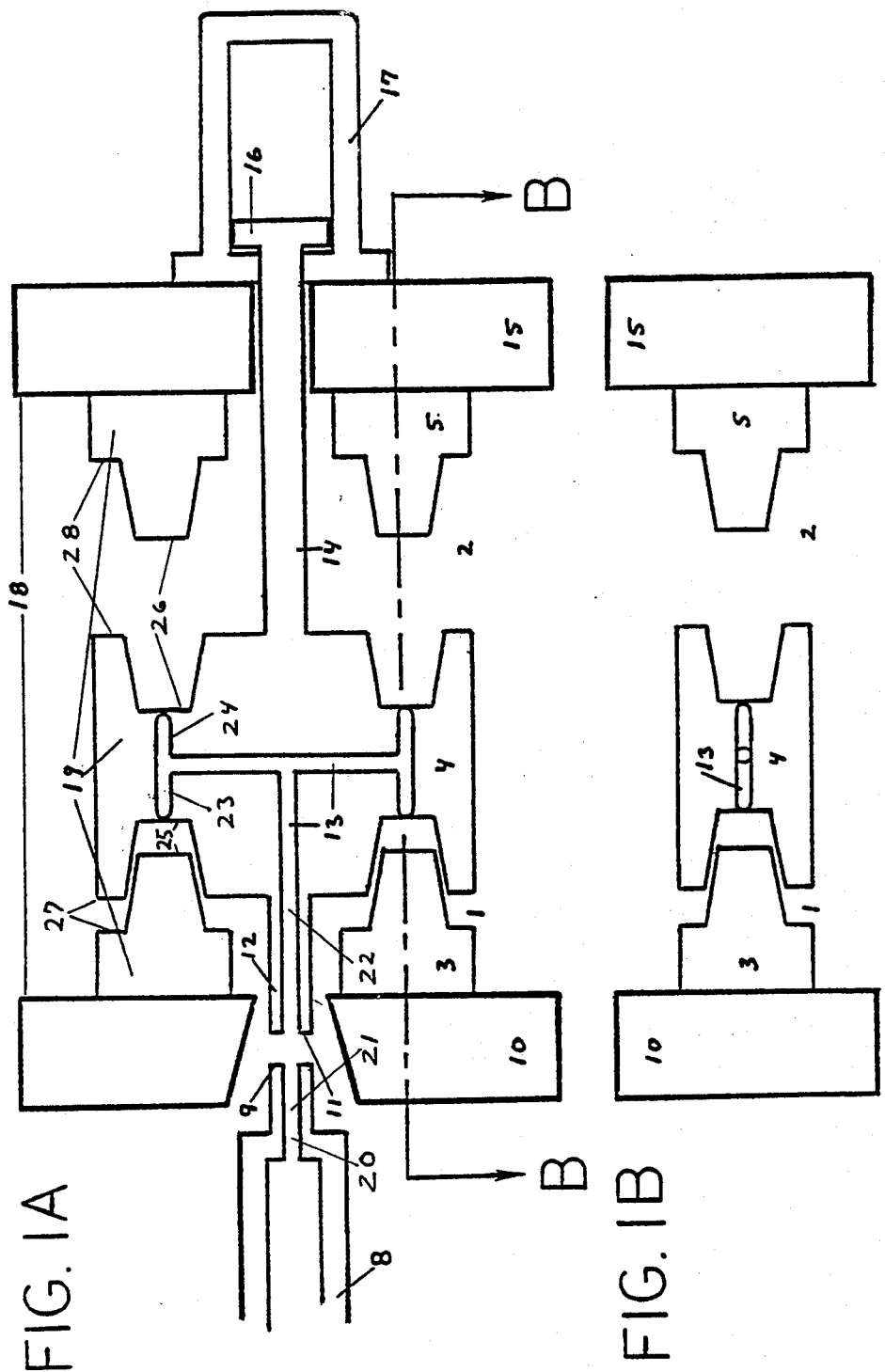

PRIOR ART

INJECTION MOLDING OF THERMOPLASTICS IN SANDWICH MOLD EMPLOYING DESYNCHRONIZED INJECTION PERIODS

This is a continuation-in-part of my co-pending patent application Ser. No. 275,408, filed June 19, 1981, entitled "Injection Molding of Thermoplastics in Sandwich Mold Employing Desynchronized Opening Periods," now U.S. Pat. No. 4,400,341 issued Aug. 23, 1983.

FIELD OF THE INVENTION

This invention generally pertains to a production method employing molds and specifically to injection molding of thermoplastics using a sandwich mold which has more than one ejection port.

DISCUSSION OF PRIOR ART

Heretofore, injection molding of thermoplastics using a sandwich mold has employed synchronized injection periods of the cooling cavities.

CROSS REFERENCE TO RELATED APPLICATIONS

The application is cross referenced to the following four applications all by the same inventor: U.S. patent application 398,606 filed July 15, 1982 entitled: DESYNCHRONOUSLY OPERATED SANDWICH MOLD; U.S. patent application 398,603 filed Sept. 16, 1982 entitled: DESYNCHRONIZED INJECTION SANDWICH MOLDING; U.S. patent application 398,602 filed July 15, 1982 entitled: DEPRESSURIZATION OF MOLTEN RUNNER SYSTEM; and U.S. patent application 436,643 filed Oct. 25, 1982 entitled: DISPLACED SNORKEL SANDWICH MOLDING.

SUMMARY OF THE INVENTION

The present invention is an improved method of cyclic injection molding a thermoplastic material. The method utilizes a combination of a sandwich mold and an injection unit which together encompass a bifurcated feed system with a molten core. The feed system includes a channel system encompassed by the injection unit and a runner system encompassed by the sandwich mold. The feed system defines a first branch for feeding a first cooling cavity encompassed by a first parting surface, and a second branch for feeding a second cooling cavity encompassed by a second parting surface. Each cooling cavity passes through a retracted period and a protracted period which together make up its production cycle. The retracted period includes an injection period and a cooling period. The protracted period includes an opening period and a closing period. The method of the present invention is characterized by the step of desynchronizing the injection period of the first cooling cavity with the injection period of the second cooling cavity.

The method of the invention provides many unusual and surprising advantages over the prior art of thermoplastic injection molding methods, where synchronized injection periods of the cooling cavities have been employed. Some of those advantages are as follows:

When desynchronizing the injection period of a first cooling cavity with the injection period of a second cooling cavity there is no problem in relation to balancing the injection of the two cooling cavities. In prior art synchronized injection one cavity may flash before the other cavity is fully injected.

When the injection period of the first cooling cavity does not overlap the injection period of the second cooling cavity the full injection power and injection volume is available to fill both the first cooling cavity and the second cooling cavity.

When the injection periods are spaced in time the plasticising is more homogeneous because the screw turns twice during the production cycle.

When desynchronizing the injection periods it is also possible to desynchronize the ejection periods with a number of further advantages.

When the ejection period of the first cooling cavity does not overlap the ejection period of the second cooling cavity the products are ejected spaced in time. This is an advantage since a more continuous supply of work is available for the packing procedure. When robotics are used it may be possible to use the same robot to service both parting surfaces.

Also, when the ejection period of the first cooling cavity does not overlap the ejection period of the second cooling cavity, the mold only needs to open 50% of the stroke required for a traditional sandwich molding cycle using synchronous ejection periods. This is a very important advantage since an injection molding machine with a smaller clamping unit may be used.

Another advantage is that the molding cycle is faster than the traditional synchronous molding cycle, since the ejection stroke is shorter. Further objects and advantages of the invention will become apparent from a consideration of the drawings and ensuing description thereof.

BRIEF DESCRIPTION OF THE DRAWINGS

FIG. 1A is a partial top sectional view of an injection molding machine and a sandwich mold assembled in such a manner as to operate in accordance with an embodiment of this invention.

FIG. 1B is a side sectional view of the injection molding machine and the sandwich mold of FIG. 1A taken as indicated by section line B-B.

DESCRIPTION OF THE PREFERRED EMBODIMENTS

Figure 2A:
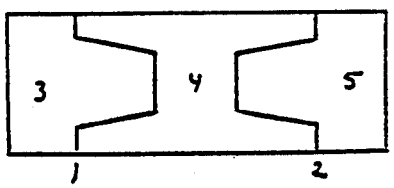
FIG. 2 is a partial side sectional chronological view of an embodiment of a prior art synchronous sandwich molding cycle.

FIG. 1 shows a part of a conventional injection unit 8 of an injection molding machine with injection nozzle 9. Also shown is a conventional clamping unit 18 of the injection molding machine comprising a stationary platen 10 and a moveable platen 15; tie rods are not shown. Also shown is a conventional sandwich mold 19 comprising a front mold part 3, an intermediate mold part 4, and a rear mold part 5. The front mold part 3 is fastened to the stationary platen 10 and the rear mold part 5 is fastened to the moveable platen 15. A first cooling cavity 1 is positioned between front mold part 3 and intermediate mold part 4, and a second cooling cavity 2 is positioned between intermediate mold part 4 and rear mold part 5. A runner bushing 12 with a filling orifice 11 extends from the intermediate mold part 4 toward the tip of the injection nozzle 9. The runner bushing 12 and the intermediate mold part 4 contain a runner system 13 of a hot runner or insulated runner type. During an injection period the tip of the injection nozzle 9 forms a seal with the filling orifice 11 of the runner bushing 12.

The sandwich mold 19 and the injection unit 8, together encompass a bifurcated feed system which comprises partly a channel system 20 encompassed by the injection unit 8 and partly a runner system 13 encompassed by the sandwich mold 19. The feed system also defines a first part of the stem 21 located in the injection unit 8, and a second part of the stem 22 located in the sandwich mold 19, and branches 23, 24 for feeding the cooling cavities 25, 26 encompassed by parting surfaces 27, 28 respectively.

The sandwich mold 19 does not have a conventional gear system to synchronize the opening period of the first cooling cavity with the opening period of the second cooling cavity. Illustrated is a conventional ejector cylinder 17 with a piston 16 which via a piston rod 14 is fastened to the intermediate mold part 4. The ejector cylinder 17 does accordingly not serve its conventional purpose, steering an ejection or stripper unit, but is in this figure used to steer the intermediate mold part 4 into any position between the front mold part 3 and the rear mold part 5 in order to desynchronize the opening period of the first cooling cavity 1 with the opening period of the second cooling cavity 2.

FIGS. 2 and 3 show the sandwich mold 19 of FIG. 1 comprising front mold part 3, intermediate mold part 4 and rear mold part 5. Also illustrated is a first cooling cavity 1 and a second cooling cavity 2, and a first ejected product 6 and a second ejected product 7.

FIG. 2 illustrates a prior art production method with synchronized opening periods which operates by passing through the following chronological periods.

FIG. 2A shows the first cooling cavity 1 and the second cooling cavity 2 both at the end of their retracted period which comprises the injection period and the cooling period, and both at the beginning of their opening periods.

Figure 2B:
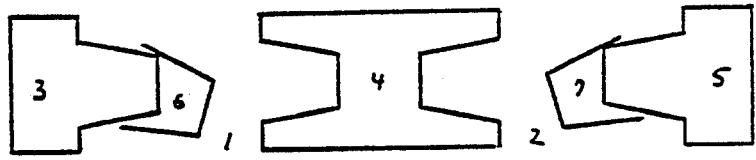

FIG. 2B shows the first cooling cavity 1 and the second cooling cavity 2, both at the end of their opening periods and at the beginning of their extended periods. Two produced products 6 and 7 are being ejected. Since both the beginning and the end of the opening periods of both cooling cavities 1 and 2 are simultaneous, the opening periods are synchronous.

Figure 2C:
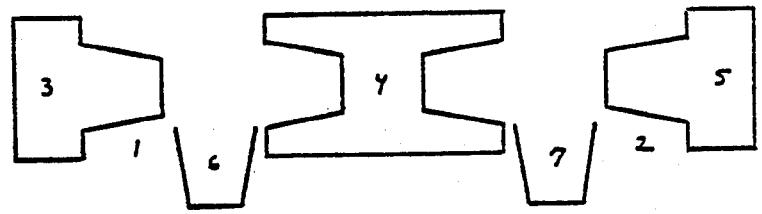

FIG. 2C shows the first cooling cavity 1 and the second cooling cavity 2, both at the end of their extended period and at the beginning of their closing period. The two produced products 6 and 7 have been ejected.

Figure 2D:
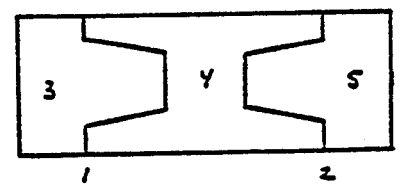

FIG. 2D shows the first cooling cavity 1 and the second cooling cavity 2, both at the end of their closing period and at the beginning of their retracted period, which ends the production cycle of both ejection ports.

FIG. 3 illustrates a preferred embodiment of the invention which operates by passing through the following chronological periods.

Figure 3A:
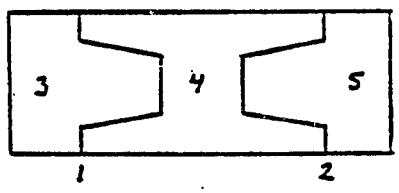
FIG. 3 is a partial side sectional chronological view of a preferred embodiment of a desynchronous sandwich molding cycle of the invention.

FIG. 3A shows the first cooling cavity 1 at the end of its cooling period and at the beginning of its opening period, and shows the second cooling cavity 2 during its injection period and during the beginning of its cooling period.

Figure 3B:
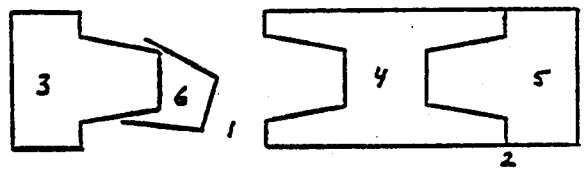

FIG. 3B shows the first cooling cavity 1 at the end of its opening period and at the beginning of its extended period. A first produced product 6 is being ejected.

FIG. 3B also shows the second cooling cavity 2 sometime during its cooling period.

Figure 3C:
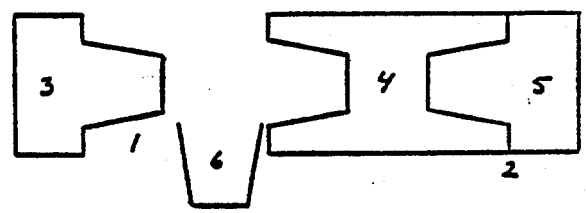

FIG. 3C shows the first cooling cavity at the end of its extended period and at the beginning of its closing period. The first produced product 6 has been ejected. FIG. 3C also shows the second cooling cavity sometime during its cooling period.

Figure 3D:
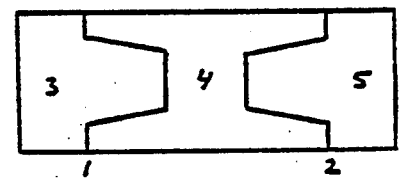

FIG. 3D shows the first cooling cavity 1 at the end of its cooling period and during its injection period and during the beginning of its cooling period and shows the second cooling cavity at the end of its cooling period and at the beginning of its opening period.

Figure 3E:
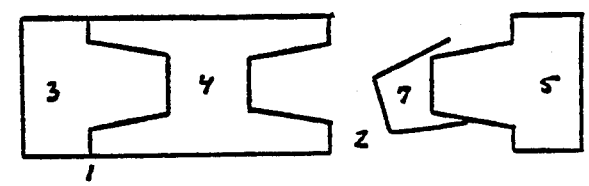

FIG. 3E shows the first cooling cavity 1 sometime during its cooling period and shows the second at the end of its opening period and at the beginning of its extended period. A second produced product 7 is being ejected.

Figure 3F:
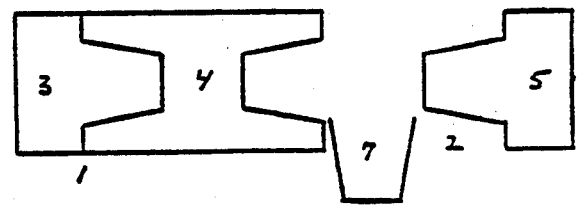

FIG. 3F shows the first cooling cavity 1 sometime during its cooling period and shows the second cooling cavity 2 at the end of its extended period and the beginning of its closing period. The produced product 7 has been ejected.

Figure 3G:
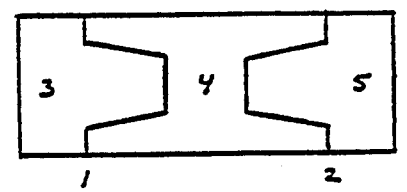

FIG. 3G shows the first cooling cavity 1 sometime during its cooling period and shows the second cooling cavity 2 at the end of its closing period and the beginning of its injection period.

In the embodiment of FIG. 3 it is possible to leave out FIGS. 3C and 3F in case the produced products 1 and 2 are able to be ejected with no extended period but only an extended point in time between the opening period and the closing period.

While the above descriptions contain many specific features, these should not be construed as limitations of the scope of the invention, but rather as an exemplification of the preferred embodiments thereof. Many other variations are possible. For example, methods utilizing a sandwich mold with more than two ejection ports and methods wherein the steering of the intermediate mold part is steered in relation to the front mold part and/or the rear mold part by employing other means than the hydraulic ejector cylinder as shown in FIG. 1A. The axis of the injection unit may be vertical and/or at right angles to the axis of the clamping unit.

The individual injection periods, opening periods, extended periods or points in time, and closing periods of the different cooling cavities may vary from those of the other cooling cavities and a total production cycle may be constructed to optimize the various obtainable advantages. Accordingly, the scope of the invention should be determined not by the embodiments illustrated, but by the appended claims and their legal equivalents.

I claim:

1. A method of cyclic injection molding a thermoplastic material, utilizing a combination of a sandwich mold and an injection unit which together encompass a bifurcated feed system with a molten core, the feed system comprising partly a channel system encompassed by the injection unit and partly a runner system encompassed by the sandwich mold, the feed system defining, a first branch for feeding a first cooling cavity encompassed by a first parting surface, and a second branch for feeding a second cooling cavity encompassed by a second parting surface, wherein each cooling cavity passes through a retracted period and a protracted period which together make up its production cycle, wherein the retracted period includes an injection period and a cooling period, and wherein the protracted period includes an opening period and a closing period, the method being characterized by the step of:
 (a) desynchronizing the injection period of the first cooling cavity with the injection period of the second cooling cavity.

2. A method according to claim 1 comprising the steps of:
 (b) beginning the injection period of the first cooling cavity subsequent to ending the protracted period of the first cooling cavity;
 (c) ending the injection period of the first cooling cavity prior to beginning the protracted period of the second cooling cavity;
 (d) beginning the injection period of the second cooling cavity subsequent to ending the protracted period of the second cooling cavity; and
 (e) ending the injection period of the second cooling cavity prior to beginning the protracted period of the first cooling cavity for the following cycle.

3. A method according to claim 1 wherein neither the first branch nor the second branch of the feed system comprises any valve.

4. A method according to claim 1 comprising the step of:
 (b) desynchronizing the protracted period of the first cooling cavity with the protracted period of the second cooling cavity.

5. A method according to claim 1 comprising the step of:
 (b) desynchronizing the opening period of the first cooling cavity with the opening period of the second cooling cavity.

6. A method according to claim 1 comprising the step of:
 (b) desynchronizing the closing period of the first cooling cavity with the closing period of the second cavity.

7. A method according to claim 1 comprising the step of:
 (b) desynchronizing the retracted period of the first cooling cavity with the retracted period of the second cavity.

8. A method according to claim 1 comprising the step of:
 (b) desynchronizing the cooling period of the first cooling cavity with the cooling period of the second cooling cavity.

9. A method according to claim 1 wherein the runner system of the mold comprises both said branches of the feed system.

10. A method according to claim 4 wherein the protracted period of the first cooling cavity does not overlap the protracted period of the second cooling cavity.

11. A method according to claim 1 wherein the injection period of the first cooling cavity does not overlap the injection period of the second cooling cavity.

* * * * *